(12) United States Patent
Kanbe

(10) Patent No.: US 11,243,062 B2
(45) Date of Patent: Feb. 8, 2022

(54) POSITION MEASUREMENT METHOD AND POSITION MEASUREMENT SYSTEM OF OBJECT IN MACHINE TOOL, AND COMPUTER-READABLE RECORDING MEDIUM

(71) Applicant: OKUMA CORPORATION, Niwa-Gun (JP)

(72) Inventor: Reiji Kanbe, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/077,484

(22) Filed: Oct. 22, 2020

(65) Prior Publication Data

US 2021/0131783 A1    May 6, 2021

(30) Foreign Application Priority Data

Nov. 6, 2019  (JP)  .............................. JP2019-201710

(51) Int. Cl.
*G01B 5/008* (2006.01)
*G01B 5/02* (2006.01)

(52) U.S. Cl.
CPC ............... *G01B 5/008* (2013.01); *G01B 5/02* (2013.01)

(58) Field of Classification Search
CPC ..................................................... G01B 5/008
USPC ........................................................ 33/503
See application file for complete search history.

(56) References Cited

U.S. PATENT DOCUMENTS

| | | | | |
|---|---|---|---|---|
| 4,100,837 A * | 7/1978 | Kohler | ............... | B23Q 11/0003 33/702 |
| 7,377,047 B2 * | 5/2008 | Kawai | ................... | B23Q 11/08 33/551 |
| 7,607,207 B2 * | 10/2009 | Buttau | .................. | B23B 31/028 279/102 |
| 10,145,682 B2 * | 12/2018 | Sagemueller | ........ | G05B 19/401 |
| 10,357,863 B2 * | 7/2019 | Matsushita | .......... | G01B 21/045 |
| 10,359,266 B2 * | 7/2019 | Kanbe | .................... | B23Q 17/22 |
| 11,156,446 B2 * | 10/2021 | Kanbe | .................... | G01B 5/008 |
| 2006/0213071 A1 * | 9/2006 | Thibaut | .................. | B23Q 17/22 33/501.18 |
| 2017/0299366 A1 | 10/2017 | Kanbe et al. | | |

FOREIGN PATENT DOCUMENTS

JP       2017-193043 A1    10/2017

* cited by examiner

*Primary Examiner* — George B Bennett
(74) *Attorney, Agent, or Firm* — Burr & Brown, PLLC

(57) ABSTRACT

A position measurement method includes, acquiring a sensing position of a distal end of a reference tool, measuring and acquiring a position of a machined surface, The method further includes measuring a position of a reference block disposed on a side of the tool sensor and calculating a relative position of the reference block to the sensing position from the sensing position and the position of the reference block, mounting the position measurement sensor to the main spindle and measuring a position of the reference block, calculating a length direction correction value of the position measurement sensor from the position of the reference block measured in the mounting of the position measurement sensor and the relative position, and measuring the object by the position measurement sensor and correcting a measurement position of the object.

9 Claims, 18 Drawing Sheets

POSITION MEASUREMENT METHOD AND POSITION MEASUREMENT SYSTEM OF OBJECT IN MACHINE TOOL, AND COMPUTER-READABLE RECORDING MEDIUM

This application claims the benefit of Japanese Patent Application Number 2019-201710 filed on Nov. 6, 2019, the entirety of which is incorporated by reference.

BACKGROUND

1. Technical Field

The disclosure relates to a position measurement method and a position measurement system to measure a position of an object, such as a tool and a workpiece, in a machine of a machine tool and a computer-readable recording medium storing a position measurement program.

2. Related Art

There has been used a method that automatically measures and corrects a tool length and a position of a workpiece for highly accurate machining in a machine tool that performs machining on the workpiece mounted to a table with a tool mounted to a main spindle to be rotated.

As the automatic measurement method of the position of the workpiece, for example, a method that acquires a coordinate at a time point when a contact of a probe, like a touch probe 30 as illustrated in FIG. 2, contacts a workpiece 31 or a time point considering a delay is used. In this case, to acquire the coordinate of the workpiece 31 in a Z-axis direction, a length of the touch probe 30 at the contact is required.

A general measuring method of the length of the touch probe 30 at the contact is as follows. A reference tool is mounted to a main spindle 2a, and while the Z-axis is manually operated such that the reference tool contacts a reference surface, such as a table 3, via a block gauge, a position where a gap between the block gauge and the reference tool becomes approximately 0 is found, and a Z-axis coordinate at the time is recorded. Then, the coordinate of the Z-axis position when the touch probe 30 is brought into contact with the reference surface is measured. A value found by subtracting the coordinate recorded with the reference tool and a thickness of the block gauge from the coordinate measured with the touch probe 30 is determined as the length of the touch probe 30 at the contact. However, manual work is required and it has been difficult to automatically measure the length of the touch probe 30 at the contact.

Accordingly, the applicant of the present disclosure has disclosed the following method as a method for automatically measuring a length of a touch probe in Japanese unexamined patent application publication No. 2017-193043 (JP-A-2017-193043). A reference block is attached to a tool sensor, such as a touch sensor and a laser sensor, a coordinate of a Z-axis position where a reference tool contacts the reference block is recorded in advance, and a coordinate of the Z-axis position where the reference tool contacts the tool sensor is acquired. From both coordinates, a relative position between the contact position with the tool sensor and the reference block is made known. Then, the contact position of the tool sensor is acquired with the reference tool, the position of the reference block is measured by a position measurement sensor, and a length of the position measurement sensor is corrected for measurement.

When the coordinate of the reference block is acquired at the first time by the method of JP-A-2017-193043, a manual work is required and it has been difficult to be automatically performed in all measurement processes.

Therefore, an object of the disclosure is to provide a position measurement method and a position measurement system of an object in a machine tool that allow automatically performing all measurement processes including a correction and a position measurement program.

SUMMARY

In order to achieve the above-described object, there is provided a position measurement method of an object in a machine tool according to a first aspect of the disclosure that measures a position of the object fixed on a table by a position measurement sensor mountable to a main spindle using the machine tool. The machine tool includes translational axes of three or more axes, the main spindle rotatable with a tool mounted thereon, and the table. The position measurement method includes following steps. The first step is acquiring a sensing position of a distal end of a reference tool using a tool sensor after mounting the reference tool serving as a reference for a length of the tool to the main spindle. The second step is obtaining a length direction correction value of the tool by the tool sensor in a state where the tool is mounted to the main spindle. The third step is rotating the tool such that the tool cuts into a machining block installed on a side of the table to machine a surface and measuring and acquiring a position of the machined surface using the position measurement sensor. The fourth step is calculating a length of the position measurement sensor from the length direction correction value of the tool acquired in the obtaining a length direction correction value and the position of the machined surface acquired in the measuring and acquiring a position of the machined surface. The fifth step is measuring a position of the reference block disposed on a side of the tool sensor using the position measurement sensor and calculating a relative position of the reference block to the sensing position from the sensing position acquired in the acquiring of the sensing position, the position of the reference block, the length of the position measurement sensor calculated in the calculating a length of the position measurement sensor, and the length of the reference tool. The sixth step is acquiring a reference tool position as a distal end position of the reference tool using the tool sensor after mounting the reference tool to the main spindle. The seventh steps is measuring a position of the reference block using the position measurement sensor after mounting the position measurement sensor to the main spindle. The eights step is calculating a length direction correction value of the position measurement sensor from the reference tool position acquired in the acquiring of the reference tool position, the position of the reference block measured in the measuring a position of the reference block, the relative position calculated in the calculating a relative position of the reference block, and the length of the reference tool. The ninth step is measuring the object by the position measurement sensor mounted to the main spindle and correcting a measurement position of the object using the length direction correction value of the position measurement sensor calculated in the calculating a length direction correction value.

Here, "a side of the table" obviously includes a case where the machining block is directly disposed on the table and also includes a case where the machining block is disposed via a tool sensor or the like on the table.

Additionally, "a side of the tool sensor" obviously includes a case where the reference block is directly disposed in the tool sensor and also includes a case where a reference block is separately disposed near the tool sensor. In the disclosure of a second aspect in the above-described configuration, from the tool sensor position acquisition stage to the relative position calculation stage are performed once. From the reference tool position acquisition stage to the position measurement stage are performed multiple times.

In the disclosure of a third aspect in the above-described configuration, the position measured in the reference block position measurement stage and the position measurement stage by the position measurement sensor is a position of the translational axes when the position measurement sensor senses a contact with the object.

In the disclosure of a fourth aspect in the above-described configuration, the reference block is a reference sphere having a spherical diameter. The position measurement sensor is a contact sensor to the object. The position measurement method further includes a diameter correction value acquisition stage of acquiring a radial direction correction value of the position measurement sensor using the reference sphere before performing the position measurement stage. The position measurement stage corrects the measurement position of the object also using the radial direction correction value acquired in the diameter correction value acquisition stage.

In order to achieve the above-described object, there is provided a position measurement system of an object in a machine tool according to a fifth aspect of the disclosure that measures a position of the object fixed on a table by a position measurement sensor in the machine tool. The machine tool includes translational axes of three or more axes, a main spindle rotatable with a tool mounted thereon, the table, the position measurement sensor mountable to the main spindle, and a control device that controls the translational axes and the main spindle. The position measurement system includes a reference tool, a tool sensor, a reference block, a machining block, a tool sensor position acquisition unit, a tool length correction value acquisition unit, a machined surface position acquisition unit, a position measurement sensor length calculation unit, a relative position calculation unit, a reference tool position acquisition unit, a reference block position measurement unit, a length correction value calculation unit, and a position measurement unit. The reference tool serves as a reference for a length of the tool. The tool sensor is configured to detect a distal end position of the reference tool mounted to the main spindle. The reference block is installed on a side of the tool sensor. The machining block is installed on a side of the table. The tool sensor position acquisition unit is configured to move the reference tool mounted to the main spindle with the translational axes, acquire a sensing position of a distal end of the reference tool using the tool sensor, and store the sensing position. The tool length correction value acquisition unit is configured to move the tool mounted to the main spindle with the translational axes and acquire a length direction correction value of the tool by the tool sensor. The machined surface position acquisition unit is configured to rotate the tool at a given position of the machining block such that the tool cuts into the machining block to machine a surface. The machined surface position acquisition unit is configured to move the position measurement sensor mounted to the main spindle with the translational axes, bring the position measurement sensor into contact with a machined surface to measure, and acquire a position of the machined surface. The position measurement sensor length calculation unit is configured to calculate a length of the position measurement sensor from the length direction correction value of the tool acquired in the tool length correction value acquisition unit and the position of the machined surface acquired in the machined surface position acquisition unit. The relative position calculation unit is configured to measure a position of the reference block using the position measurement sensor mounted to the main spindle and store the position of the reference block. The relative position calculation unit is configured to calculate a relative position of the reference block to the sensing position from the sensing position acquired in the tool sensor position acquisition unit, the position of the reference block, the length of the position measurement sensor calculated in the position measurement sensor length calculation unit, and the length of the reference tool, and store the relative position. The reference tool position acquisition unit is configured to move the reference tool mounted to the main spindle with the translational axes, acquire a reference tool position as the distal end position of the reference tool using the tool sensor, and store the reference tool position. The reference block position measurement unit is configured to measure a position of the reference block by the position measurement sensor mounted to the main spindle and store the position of the reference block. The length correction value calculation unit is configured to calculate a length direction correction value of the position measurement sensor from the reference tool position acquired in the reference tool position acquisition unit, the position of the reference block acquired in the reference block position measurement unit, the relative position acquired in the relative position calculation unit, and the length of the reference tool, and store the length direction correction value. The position measurement unit is configured to measure the object by the position measurement sensor mounted to the main spindle and correct a measurement position of the object using the length direction correction value of the position measurement sensor calculated in the length correction value calculation unit.

In the disclosure of a sixth aspect in the above-described configuration, the machining block is installed to the tool sensor fixed on the table.

In the disclosure of a seventh aspect in the above-described configuration, the position measurement sensor is configured to measure a position of the translational axes when the position measurement sensor senses the object or a position considering a signal delay.

The disclosure of an eighth aspect in the above-described configuration further includes a diameter correction value acquisition unit configured to use the reference block as a reference sphere having a spherical diameter and the position measurement sensor as a contact sensor to the object. The diameter correction value acquisition unit is configured to acquire and store a radial direction correction value of the position measurement sensor. The position measurement unit is configured to correct the measurement position using the length correction value acquired in the length correction value calculation unit and the diameter correction value acquired in the diameter correction value acquisition unit.

In order to achieve the above-described object, there is provided a position measurement program according to a ninth aspect of the disclosure. The position measurement program causes a control device of a machine tool to perform the position measurement method of the object in the machine tool according to any one of the first to the fourth aspects. The machine tool includes translational axes of three or more axes, a main spindle rotatable with a tool mounted thereon, and a table.

With the disclosure, the position of the machined surface which is formed by machining the machining block with the tool is measured by the position measurement sensor. The length of the tool is made known by the tool sensor in advance. As a result, the length of the position measurement sensor, which needs to be made known, can be automatically measured.

Accordingly, the positional relationship between the sensing position by the tool sensor and the reference block is made known from the length of the position measurement sensor and the position of the reference block measured by the position measurement sensor. Thus, after that, by automatically measuring the reference tool by the tool sensor and automatically measuring the reference block by the position measurement sensor, the length of the position measurement sensor, namely, the length direction correction value is automatically measurable.

Additionally, when the position measurement sensor is a contact type, acquiring the correction value in the radial direction together allows further highly accurately measuring the position of the object.

As a result, even when the length of the position measurement sensor changes due to, for example, thermal displacement, all measurement processes including the correction can be automatically performed.

DETAILED DESCRIPTION

The following describes embodiments of the disclosure based on the drawings.

Figure 1:
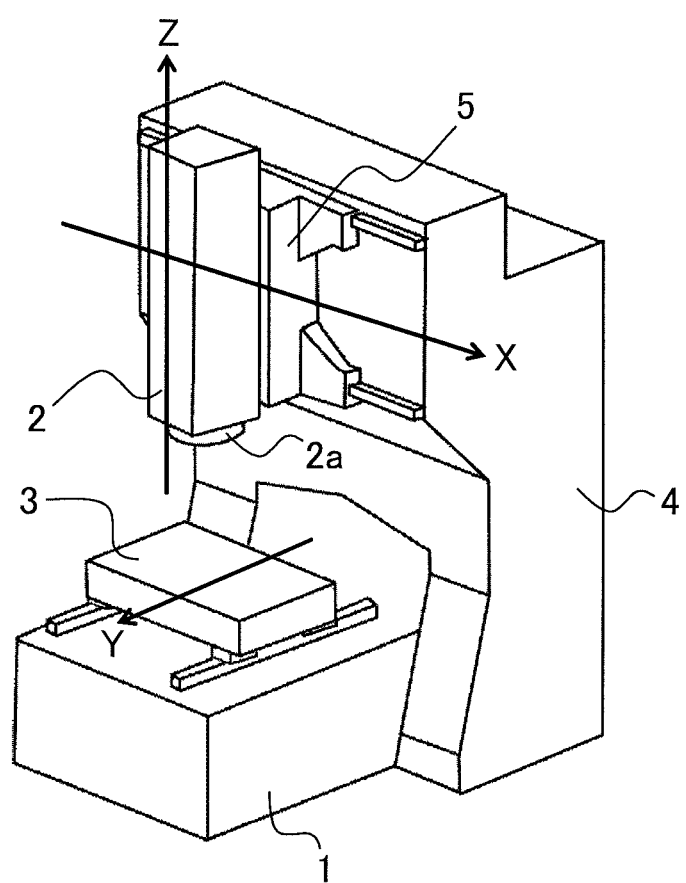
FIG. 1 is a schematic diagram of a machining center.
Figure 2:
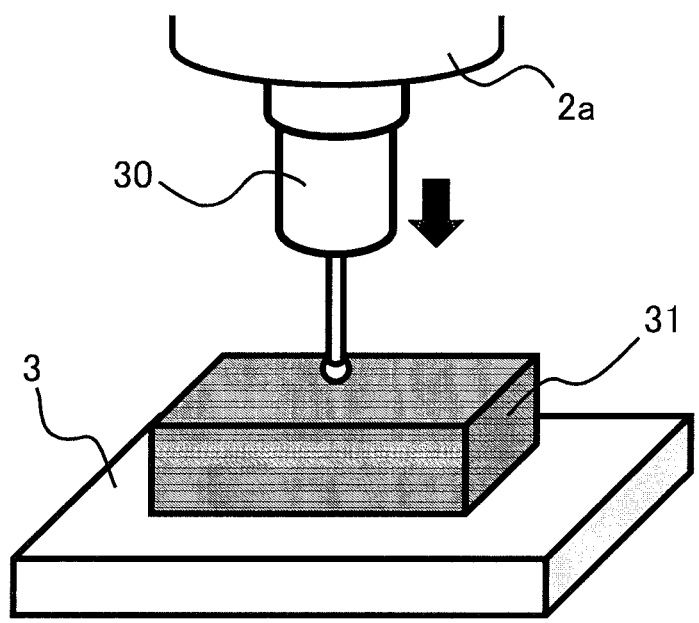
FIG. 2 is a schematic diagram of a touch probe.

FIG. 1 is a schematic diagram of a machining center as one configuration of a machine tool that includes three translational axes orthogonal to one another.

A main spindle head 2 can move in two degrees of freedom for translation relative to a bed 1 by an X-axis and a Z-axis, which are the translational axes orthogonal to one another, via a column 4 and a saddle 5. A table 3 can move in one degree of freedom for translation relative to the bed 1 by a Y-axis, which is the translational axis perpendicular to the X-axis and the Z-axis. Accordingly, the main spindle head 2 can move in three degrees of freedom for translation relative to the table 3. Each feed axis is driven by a servomotor controlled by a numerical control device (not illustrated). A workpiece is fixed to the table 3, a tool is mounted to a main spindle 2a of the main spindle head 2 to be rotated, and a relative position and a relative posture between the workpiece and the tool are controlled, thus ensuring machining of the workpiece.

In response to programs preliminarily stored in a storage unit, the numerical control device as a control device of the disclosure functions as a tool sensor position acquisition unit, a tool length correction value acquisition unit, a machined surface position acquisition unit, a position measurement sensor length calculation unit, a relative position calculation unit, a reference tool position acquisition unit, a reference block position measurement unit, a length correction value calculation unit, a diameter correction value acquisition unit, and a position measurement unit. The attachment and removal of a cutting tool to the main spindle 2a and the attachment and removal of a reference tool and a touch probe described later in association with the measurement of an object are manually performed by an operator or automatically performed by the numerical control device via a tool changer.

Note that the machine related to the disclosure is not limited to the machining center but may be a machine tool, such as a lathe, a multitasking machine, and a grinder. The number of axes is not limited to three axes but may be three axes, four axes, and six axes only for the translational axes. Further, the table 3 and the main spindle head 2 may be a mechanism having one degree or more of freedom for rotation with rotation axis.

Figure 3:
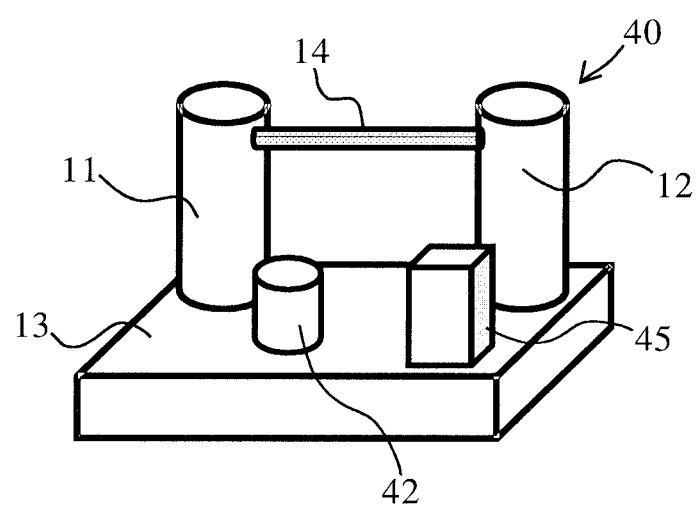
FIG. 3 is a schematic diagram of a laser sensor as one example of a tool sensor of the disclosure.
Figure 4:
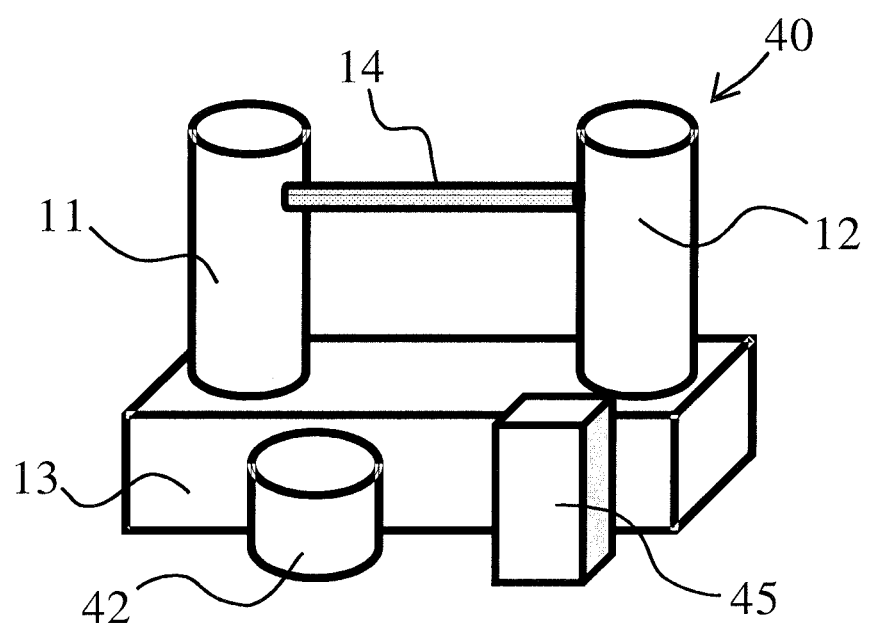
FIG. 4 is a schematic diagram of the laser sensor as one example of the tool sensor of the disclosure.

FIG. 3 is a schematic diagram of a laser sensor 40 as one example of a tool sensor of the disclosure. The laser sensor 40 includes a laser emitting unit 11 that emits a laser 14, a laser receiving unit 12 that receives the laser 14, a base portion 13, a reference block 42, and a machining block 45. The laser emitting unit 11, the laser receiving unit 12, the reference block 42, and the machining block 45 are fixed to the base portion 13. The laser sensor 40 is mounted to a top surface of the table 3 of the machining center in FIG. 1. Note that, as illustrated in FIG. 4, a configuration in which the reference block 42 and the machining block 45 are separately placed near the base portion 13 may be employed.

Figure 5:
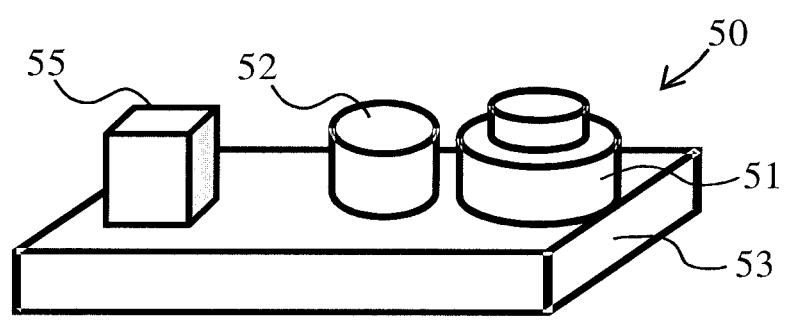
FIG. 5 is a schematic diagram of the touch sensor as one example of the tool sensor of the disclosure.
Figure 6:
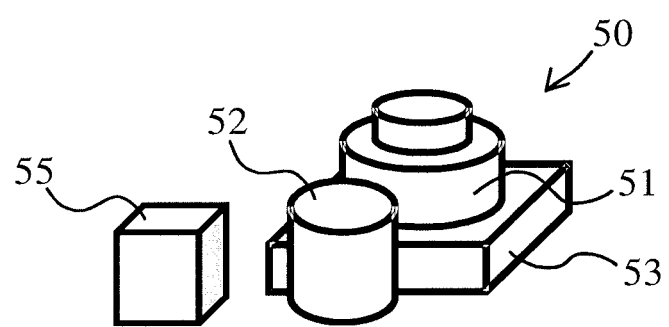
FIG. 6 is a schematic diagram of the touch sensor as one example of the tool sensor of the disclosure.

FIG. 5 is a schematic diagram of a touch sensor 50 as one example of the tool sensor of the disclosure. The touch sensor 50 includes a touch sensor portion 51, a reference block 52, a machining block 55, and a base portion 53. The touch sensor portion 51, the reference block 52, and the machining block 55 are fixed to the base portion 53. Similarly to the laser sensor 40, the touch sensor 50 is mounted to the top surface of the table 3 of the machining center in FIG. 1. Note that, as illustrated in FIG. 6, a configuration in which the reference block 52 and the machining block 55 are separately placed near the base portion 53 may be employed.

Figure 7A:
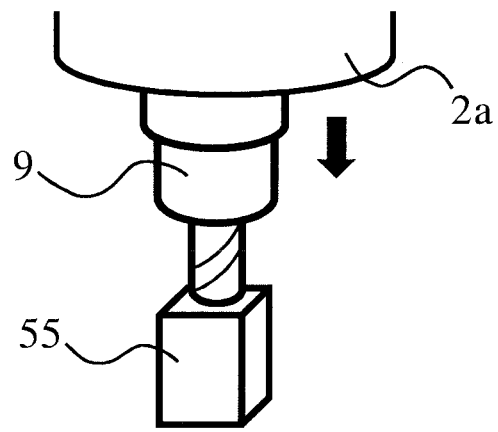
FIG. 7A is schematic diagrams of a procedure for measuring a length of a position measurement sensor.
Figure 7B:
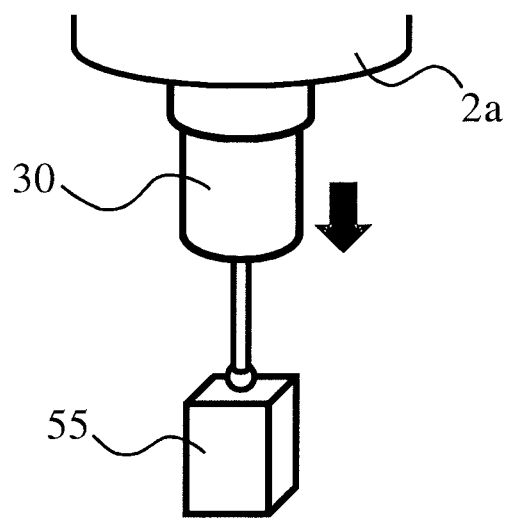
FIG. 7B is schematic diagrams of a procedure for measuring a length of a position measurement sensor.

FIG. 7A and FIG. 7B are schematic diagrams of one example of unit that measures a length of a position measurement sensor of the disclosure. The machining block 55, a cutting tool 9 (FIG. 7A), and a touch probe 30 (FIG. 7B) as the position measurement sensor are used. The machining block 55 is mounted to the base portion 53 of the touch sensor 50 as in FIG. 5 or separately placed near the base portion 53 as illustrated in FIG. 6.

Hereinafter, a case of using the touch sensor 50 as the tool sensor will be described. The touch sensor 50 and the laser sensor 40 are inherently the same and differ only in a sensing method.

Figure 8:
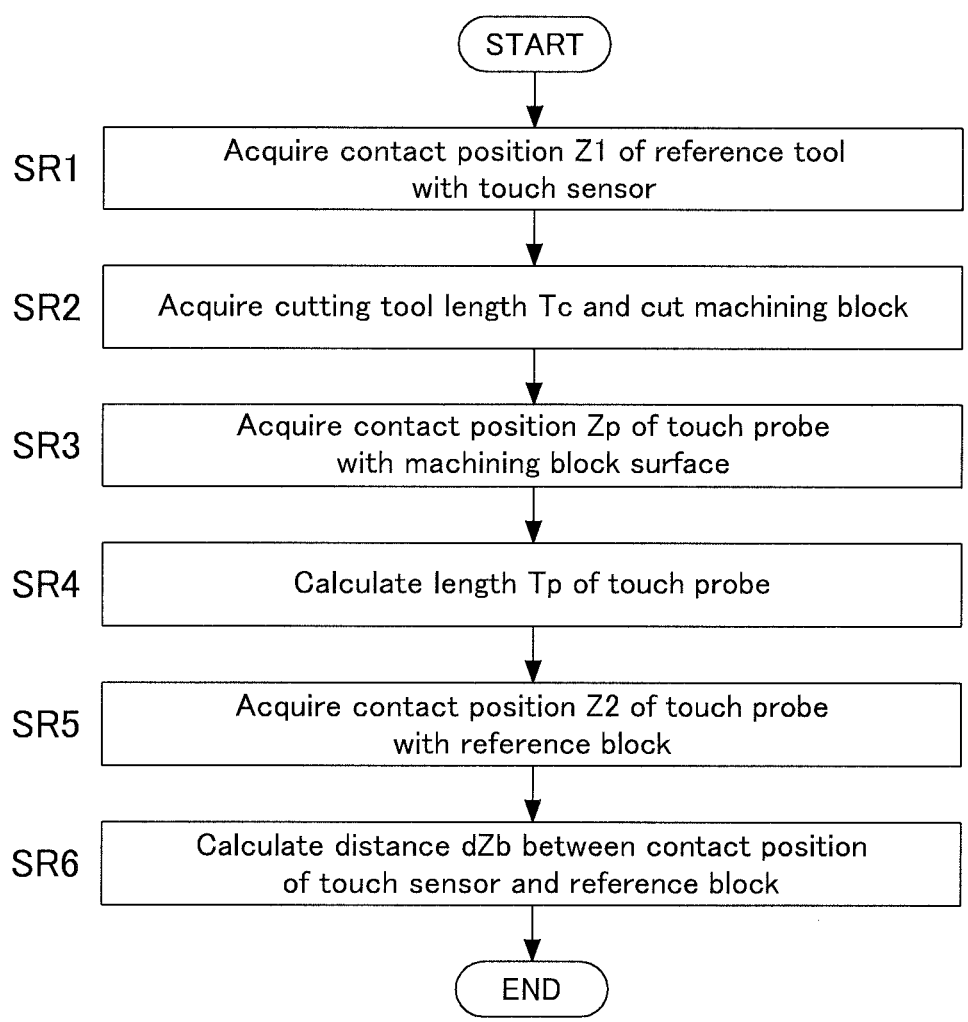
FIG. 8 is a flowchart for a measurement preparation work of the disclosure.

A procedure for a measurement preparation work will be described based on a flowchart of FIG. 8. The measurement preparation work is a work performed in advance before performing measurement by the touch probe described later.

Figure 10:
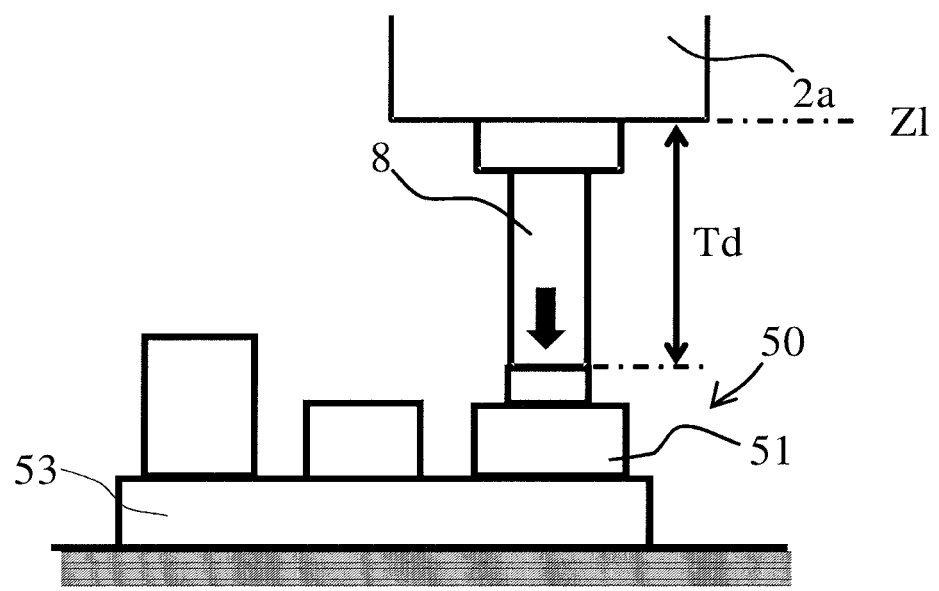
FIG. 10 is an explanatory view of Step SR1 of the measurement preparation work of the disclosure.

At Step SR1, a reference tool 8 is mounted to the main spindle 2a, and the measurement is performed by the touch sensor 50 (tool sensor position acquisition stage). Here, as illustrated in FIG. 10, the Z-axis is moved such that the reference tool 8 contacts the touch sensor portion 51 to acquire a contact position Z1 in the Z-axis direction at a time point of a distal end of the reference tool 8 pressing the touch sensor portion 51 or a time point considering a signal delay. The acquired contact position Z1 is stored in the storage unit in the numerical control device. A length Td of the reference tool 8 is also stored preliminarily in the storage unit.

At Step SR2, as a pre-preparation for measuring the length of the touch probe, the cutting tool 9 is mounted to the main spindle 2a, the measurement is performed by the touch sensor 50, and a length Tc of the cutting tool 9 is obtained (tool length correction value acquisition stage). The operation is similar to Step SR1, the Z-axis is moved such that the cutting tool 9 contacts the touch sensor portion 51, and a contact position ZZ in the Z-axis direction is acquired at a time point when a distal end of the cutting tool 9 presses the touch sensor portion 51 or a time point when a signal delay is considered. A length of the cutting tool 9 as Tc=Td+(ZZ−Z1) is calculated from the acquired contact position ZZ, the contact position Z1 acquired at Step SR1, and the length Td of the reference tool 8 and the calculated length is stored in the storage unit.

Figure 11:
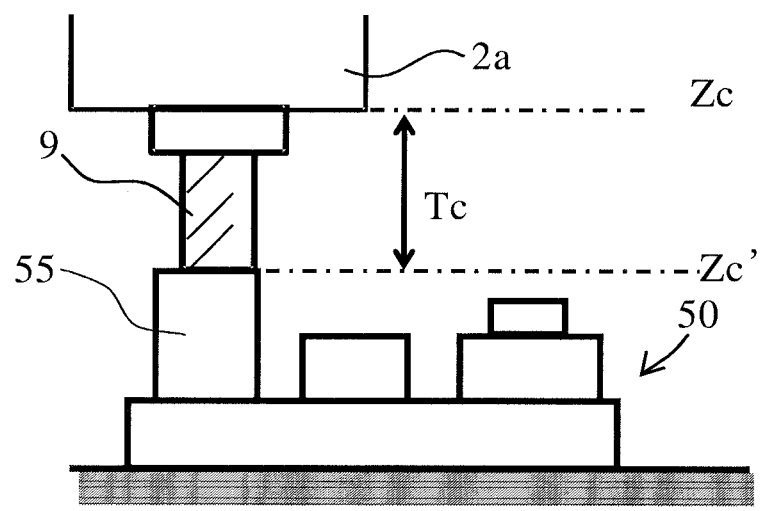
FIG. 11 is an explanatory view of Step SR2 of the measurement preparation work of the disclosure.

As illustrated in FIG. 11, the cutting tool 9 cuts into a longitudinal direction of the machining block 55 to machine a surface up to a position Zc', and a Z-axis position Zc at the time is acquired. From the acquired Z-axis position Zc and the length of the cutting tool 9, a machined surface Zc'=Zc−Tc is calculated and stored in the storage unit.

Figure 12:
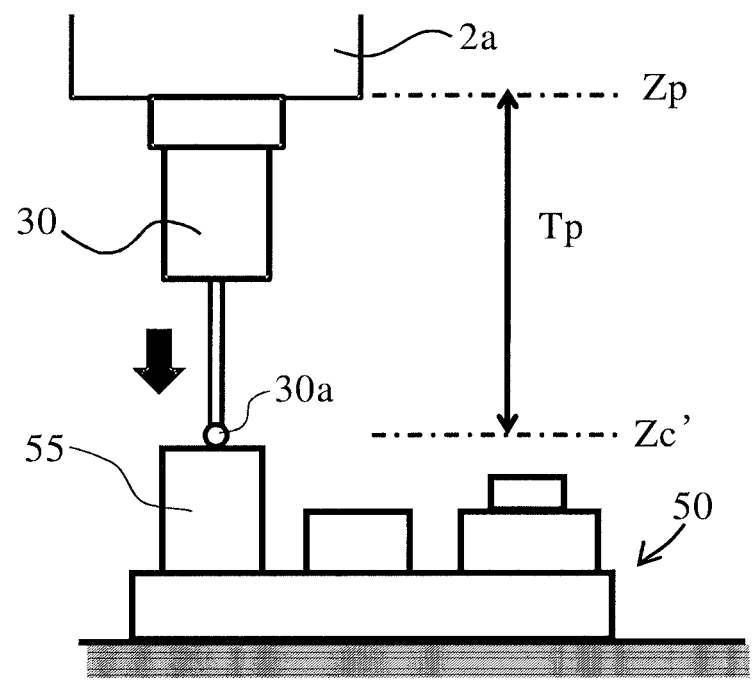
FIG. 12 is an explanatory view of Step SR3 of a measuring method of the disclosure.

At Step SR3, the touch probe 30 is mounted to the main spindle 2a and the machined surface Zc' of the machining block 55 same as that in Step SR2 is measured (machined surface position acquisition stage). Here, as illustrated in FIG. 12, the Z-axis is moved such that the touch probe 30 approaches the measurement position of the Zc' position of the machining block 55 same as that in Step SR2. A contact position Zp in the Z-axis direction is acquired at a time point when a stylus 30a of the touch probe 30 is in contact and a trigger signal is transmitted or at a time point when a signal delay is considered. The acquired contact position Zp is stored in the storage unit.

At Step SR4, the length of the touch probe 30 at the contact as a length direction correction value of the touch probe 30 is calculated (position measurement sensor length calculation stage). Here, from the position Zc' of the machined surface stored at Step SR2 and the contact position Zp stored at Step SR3, a length direction correction value Tp (=Zp−Zc') as the length of the touch probe 30 is obtained and stored in the storage unit.

Figure 13:
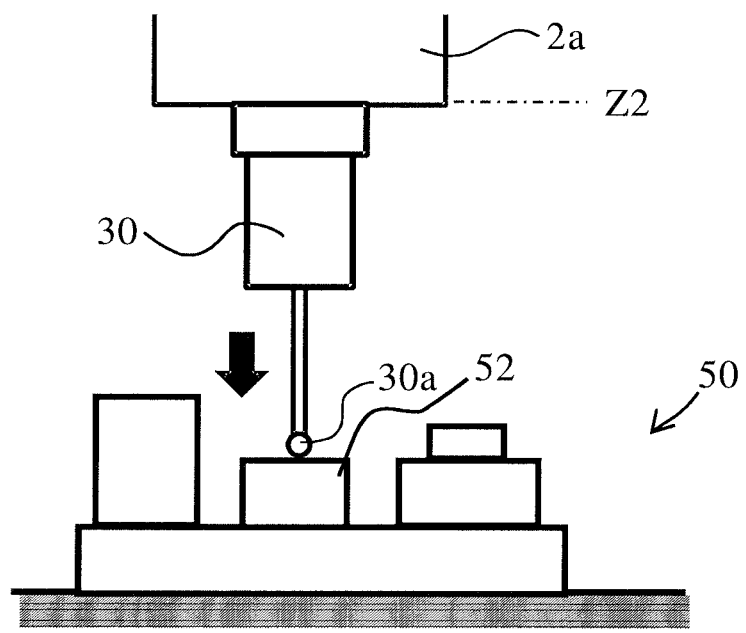
FIG. 13 is an explanatory view of Step SR5 of the measuring method of the disclosure.

At Step SR5, the touch probe 30 is mounted to the main spindle 2a, and a contact position Z2 in the Z-axis direction of the reference block 52 (position of the reference block) is measured. Here, as illustrated in FIG. 13, the Z-axis is moved such that the touch probe 30 approaches the reference block 52 and the contact position Z2 in the Z-axis direction is acquired at a time point when the stylus 30a of the touch probe 30 is in contact and the trigger signal is transmitted or a time point when a signal delay is considered.

At Step SR6, a distance (relative position) dZb in the Z-axis direction between the sensing position by the touch sensor 50 and a sensing position of the reference block 52 by the touch probe 30 is calculated (Steps SR5, SR6: relative position calculation stage). Here, from the contact position Z1 of the reference tool 8 with the touch sensor 50 obtained at Step SR1, the contact position Z2 of the touch probe 30 with the reference block 52 obtained at Step SR5, the length correction value Tp of the touch probe 30, and the reference tool length Td, the distance dZb (=Z2+Tp−(Z1+Td)) in the Z-axis direction between the contact position Z1 with the touch sensor 50 and the contact position Z2 with the reference block 52 is obtained and stored in the storage unit.

Figure 9:
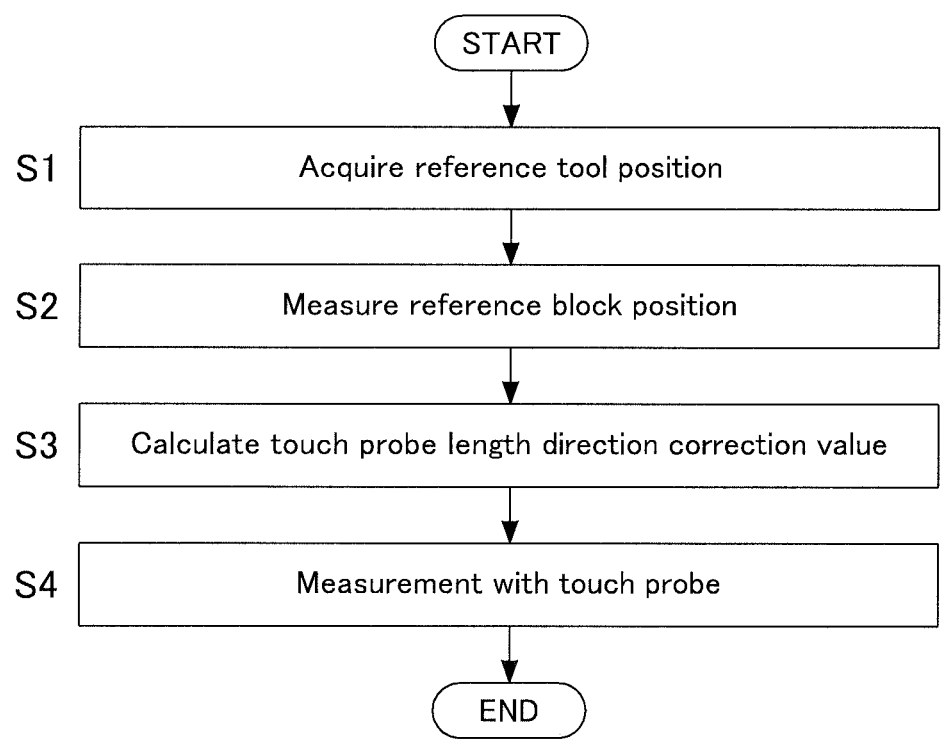
FIG. 9 is a flowchart for a touch probe measuring method of the disclosure.

Next, a flow of the measurement with the touch probe 30 in the disclosure will be described based on the flowchart of FIG. 9.

At Step S1, similarly to Step SR1, the reference tool 8 is mounted to the main spindle 2a, the measurement is performed by the touch sensor 50, and a contact position Z1' (reference tool position acquisition stage) is stored in the storage unit.

At Step S2, similarly to Step SR5, the touch probe 30 is mounted to the main spindle 2a, the reference block 52 is measured by the touch probe 30, and a contact position Z2' (position of the reference block) (reference block position measurement stage) is stored in the storage unit.

At Step S3, the length of the touch probe 30 at the contact as the length direction correction value of the touch probe 30 is calculated (length correction value calculation stage). A length direction correction value Tp' (=Z1'−Z2'+dZb+Td) is obtained from the contact position Z1' stored at Step S1 and the contact position Z2' stored at Step S2, and the distance dZb between the contact position of the touch sensor 50 and the contact position of the reference block 52 and the reference tool length Td stored in the storage unit. The length direction correction value Tp' is stored in the storage unit.

At Step S4, the object is measured using the touch probe 30 (position measurement stage). Then, the measurement position is corrected using the length direction correction value Tp' of the touch probe 30 calculated at Step S3.

Thus, in the position measurement method and the position measurement system of the object with the configurations, the numerical control device performs Step SR1 of acquiring the sensing position (contact position Z1) of the distal end of the reference tool 8 using the touch sensor 50 (tool sensor) and Step SR2 of obtaining the length Tc of the cutting tool 9 (tool) (length direction correction value of the tool) by the touch sensor 50. Then, Step SR3 is performed in which the cutting tool 9 cuts into the machining block 55 to machine the machined surface Zc' and measures and acquires the contact position Zp (position of the machined surface) using the touch probe 30 (position measurement sensor). Step SR4 is performed by calculating the length Tp of the touch probe 30 (length direction correction value) from the contact position Zc' based on the length Tc of the cutting tool 9 and the contact position Zp. Additionally, Steps SR5 and SR6 are performed by measuring the contact position Z2 of the reference block 52 (position of the reference block) using the touch probe 30 and calculating the distance dZb (relative position) of the reference block 52 with respect to the contact position Z1 from the contact position Z1, the contact position Z2, the length Tp of the touch probe 30, and the length of the reference tool 8.

Then, the numerical control device performs Step S1 of acquiring the contact position Z1' (reference tool position) using the touch sensor 50 and Step S2 of measuring the contact position Z2' of the reference block 52 (position of the reference block) using the touch probe 30. Additionally, Step S3 is performed by calculating the length direction correction value Tp' of the touch probe 30 from the contact position Z1', the contact position Z2', the distance dZb, and the length Td of the reference tool 8. Then, Step S4 is performed by measuring the object by the touch probe 30 and correcting the measurement position of the object using the length direction correction value Tp' of the touch probe 30.

Following these steps, the contact position Zp with the machined surface Zc' which is a surface formed by machining the block 55 with the cutting tool 9 is measured by the touch probe 30. The length of the cutting tool 9 is made known by the touch sensor 50 in advance. As a result, the length of the touch probe 30, which needs to be made known, can be automatically measured.

Accordingly, the positional relationship between the sensing position by the touch sensor 50 and the reference block 52 is made known from the length of the touch probe 30 and the position of the reference block 52 measured by the touch probe 30. Thus, after that, by automatically measuring the reference tool 8 by the touch sensor 50 and automatically measuring the reference block 52 by the touch sensor 50, the length of the touch probe 30, namely, the length direction correction value is automatically measurable.

Therefore, even when the length of the touch probe 30 changes due to, for example, thermal displacement, the numerical control device can perform all the measurement processes including the correction automatically.

Other embodiments of the disclosure will be described using the diagrams.

Figure 14:
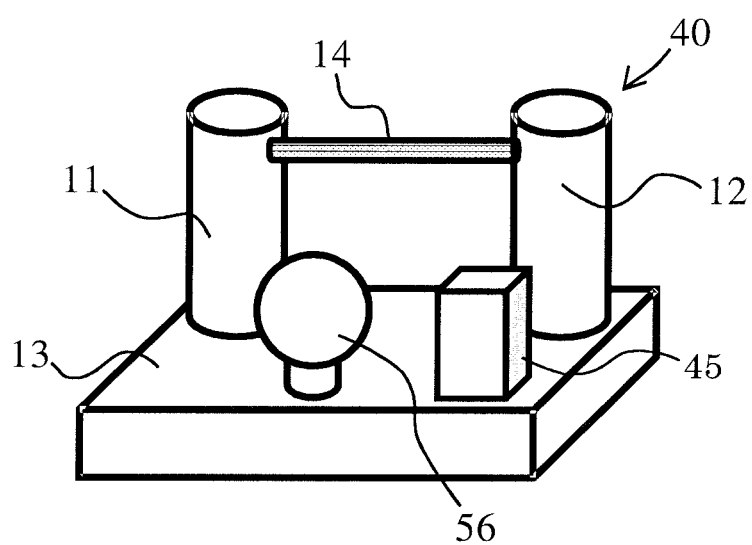
FIG. 14 is a schematic diagram of a laser sensor as one example of the tool sensor of the disclosure.
Figure 15:
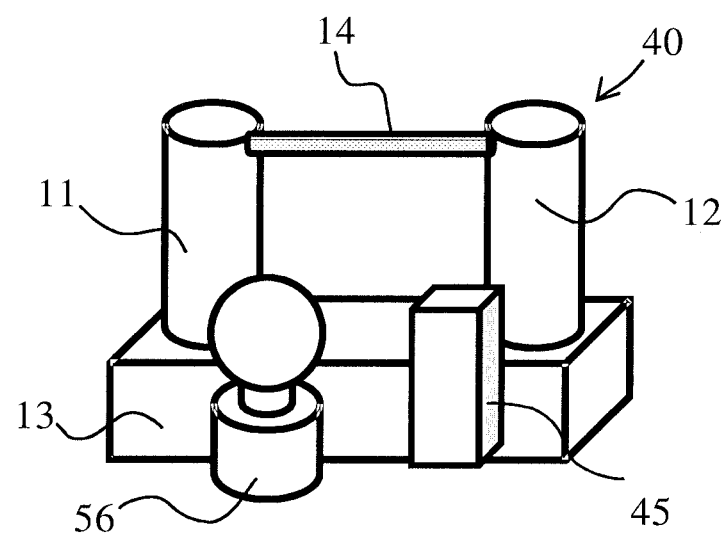
FIG. 15 is a schematic diagram of the laser sensor as one example of the tool sensor of the disclosure.

FIG. 14 is a schematic diagram of the laser sensor 40 according to another configuration of the disclosure. The laser sensor 40 includes the laser emitting unit 11, the laser receiving unit 12, the base portion 13, a reference sphere 56, and the machining block 45, and the reference sphere 56 and the machining block 45 are fixed to the base portion 13. Note that, as illustrated in FIG. 15, a configuration in which the reference sphere 56 and the machining block 45 are separately placed near the base portion 13 may be employed.

Figure 16:
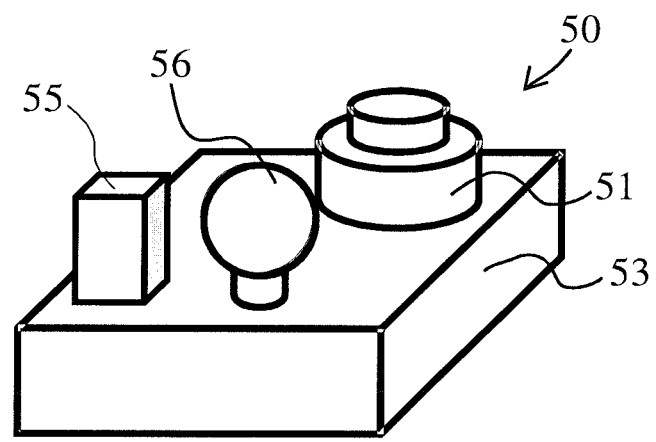
FIG. 16 is a schematic diagram of a touch sensor as one example of the tool sensor of the disclosure.
Figure 17:
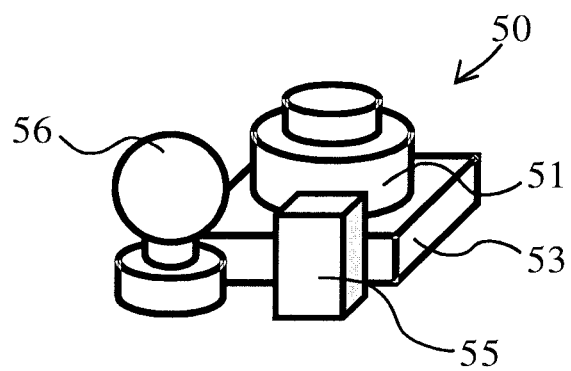
FIG. 17 is a schematic diagram of the touch sensor as one example of the tool sensor of the disclosure.

FIG. 16 is a schematic diagram of the touch sensor 50 as one example of the tool sensor according to another configuration of the disclosure. The touch sensor 50 includes the touch sensor portion 51, the reference sphere 56, the base portion 53, and the machining block 55. The touch sensor portion 51, the reference sphere 56, and the machining block 55 are fixed to the base portion 53. Note that, as illustrated in FIG. 17, a configuration in which the reference sphere 56 and the machining block 55 are separately placed near the base portion 53 may be employed.

Figure 18:
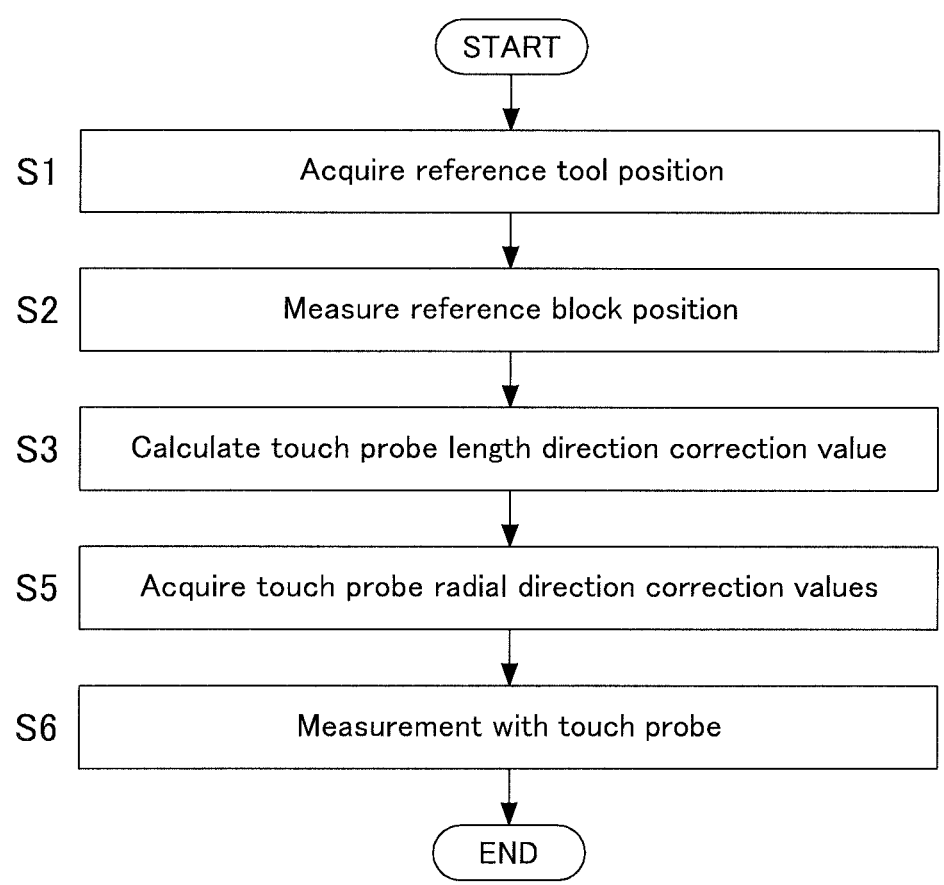
FIG. 18 is a flowchart for a touch probe measuring method of the disclosure.

Hereinafter, a flow of the measurement with the touch probe 30 using the laser sensor 40 as the tool sensor will be described based on the flowchart of FIG. 18. The touch sensor 50 and the laser sensor 40 are inherently the same and differ only in a sensing method. Except that the laser sensor 40 is used, Steps S1 to S3 are same as those of FIG. 9, and therefore the description will be omitted.

At Step S5, a diameter correction value of the touch probe 30 is acquired (diameter correction value acquisition stage). Here, on an identical plane in a horizontal direction of the reference sphere 56 (radial direction of the touch probe 30), four tops in total, positive and negative directions of the X-axis and positive and negative directions of the Y-axis, are measured by the touch probe 30. Then, the main spindle 2a is indexed such that the contact points of the touch probe 30 become identical. An average value of the acquired X-axis positions and an average value of the acquired Y-axis positions become X, Y coordinate values of the center of the reference sphere 56, respectively. The four tops are measured again with respect to X and Y of the center position. From differences between the acquired four positions and the center position, an X-axis positive direction correction value Rxp, an X-axis negative direction correction value Rxm, a Y-axis positive direction correction value Ryp, and a Y-axis negative direction correction value Rym of the touch probe 30 are calculated.

At Step S6, the object is measured using the touch probe 30. Then, the measurement position is corrected using the length direction correction value Tp of the touch probe 30 calculated at Step S3 and the radial direction correction values Rxp, Rxm, Ryp, Rym of the touch probe 30 calculated at Step S5.

Thus, when the contact type touch probe 30 is used, acquiring the correction values in the radial direction together allows the position measurement of the object with further high accuracy.

In the configuration, although Steps SR1 to SR5 as the measurement preparation work are enough to be performed once, Steps S1 to S4 may be performed multiple times.

The position measurement sensor is not limited to the touch probe, and a non-contact sensor, such as a laser displacement sensor, can also be employed. In the case, not the length at the contact but an apparent distance between a measured object and the non-contact sensor at the measurement becomes the measurement target.

Additionally, when the touch probe length is set as a relative length with the reference tool length, the cutting tool 9 may be used instead of the reference tool 8 to acquire the contact position Z1 of the cutting tool with the touch sensor.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A position measurement method of an object in a machine tool that measures a position of the object fixed on a table by a position measurement sensor mountable to a main spindle using the machine tool, the machine tool including translational axes of three or more axes, the main spindle rotatable with a tool mounted thereon, and the table, the position measurement method comprising:
  acquiring a sensing position of a distal end of a reference tool using a tool sensor after mounting the reference tool serving as a reference for a length of the tool to the main spindle;
  mounting the tool to the main spindle and obtaining a length direction correction value of the tool by the tool sensor;
  rotating the tool such that the tool cuts into a machining block installed on a side of the table to machine a surface and measuring and acquiring a position of the machined surface using the position measurement sensor;
  calculating a length of the position measurement sensor from the length direction correction value of the tool acquired in the obtaining a length direction correction value and the position of the machined surface acquired in the measuring and acquiring a position of the machined surface;
  measuring a position of the reference block disposed on a side of the tool sensor using the position measurement sensor and calculating a relative position of the reference block to the sensing position from the sensing position acquired in the acquiring of the sensing position, the position of the reference block, the length of the position measurement sensor calculated in the calculating a length of the position measurement sensor, and the length of the reference tool;
  acquiring a reference tool position as a distal end position of the reference tool using the tool sensor after mounting the reference tool to the main spindle;
  mounting the position measurement sensor to the main spindle and measuring a position of the reference block using the position measurement sensor;
  calculating a length direction correction value of the position measurement sensor from the reference tool position acquired in the acquiring of the reference tool position, the position of the reference block measured in the measuring a position of the reference block, the relative position calculated in the calculating a relative position of the reference block, and the length of the reference tool; and
  measuring the object by the position measurement sensor mounted to the main spindle and correcting a measurement position of the object using the length direction correction value of the position measurement sensor calculated in the calculating a length direction correction value.

2. The position measurement method of the object in the machine tool according to claim 1, wherein
  from the acquiring of the sensing position to the calculating a relative position of the reference block are performed once, and
  from the acquiring of the reference tool position to the correcting a measurement position of the object are performed multiple times.

3. The position measurement method of the object in the machine tool according to claim 1, wherein
  the position measured in the measuring a position of the reference block and the correcting a measurement position of the object by the position measurement sensor is a position of the translational axes when the position measurement sensor senses a contact with the object.

4. The position measurement method of the object in the machine tool according to claim 1, wherein the reference block is a reference sphere having a spherical diameter, and the position measurement sensor is a contact sensor to the object,
the position measurement method further includes acquiring a radial direction correction value of the position measurement sensor using the reference sphere before performing the correcting a measurement position of the object, and
the correcting a measurement position of the object includes correcting the measurement position of the object also using the radial direction correction value acquired in the acquiring of the radial direction correction value.

5. A position measurement system of an object in a machine tool that measures a position of the object fixed on a table by a position measurement sensor in the machine tool, the machine tool including translational axes of three or more axes, a main spindle rotatable with a tool mounted thereon, the table, the position measurement sensor mountable to the main spindle, and a control device that controls the translational axes and the main spindle, the position measurement system comprising:
  a reference tool serving as a reference for a length of the tool;
  a tool sensor configured to detect a distal end position of the reference tool mounted to the main spindle;
  a reference block installed on a side of the tool sensor;
  a machining block installed on a side of the table;
  a tool sensor position acquisition unit configured to move the reference tool mounted to the main spindle with the translational axes, acquire a sensing position of a distal end of the reference tool using the tool sensor, and store the sensing position;
  a tool length correction value acquisition unit configured to move the tool mounted to the main spindle with the translational axes and acquire a length direction correction value of the tool by the tool sensor;
  a machined surface position acquisition unit configured to rotate the tool at a given position of the machining block such that the tool cuts into the machining block to machine a surface, the machined surface position acquisition unit being configured to move the position measurement sensor mounted to the main spindle with the translational axes, bring the position measurement sensor into contact with a machined surface to measure and acquire a position of the machined surface;
  a position measurement sensor length calculation unit configured to calculate a length of the position measurement sensor from the length direction correction value of the tool acquired in the tool length correction value acquisition unit and the position of the machined surface acquired in the machined surface position acquisition unit;
  a relative position calculation unit configured to measure a position of the reference block using the position measurement sensor mounted to the main spindle and store the position of the reference block, the relative position calculation unit being configured to calculate a relative position of the reference block to the sensing position from the sensing position acquired in the tool sensor position acquisition unit, the position of the reference block, the length of the position measurement sensor acquired in the position measurement sensor length calculation unit, and the length of the reference tool and store the relative position;
  a reference tool position acquisition unit configured to move the reference tool mounted to the main spindle with the translational axes, acquire a reference tool position as the distal end position of the reference tool using the tool sensor, and store the reference tool position;

a reference block position measurement unit configured to measure a position of the reference block by the position measurement sensor mounted to the main spindle and store the position of the reference block;

a length correction value calculation unit configured to calculate a length direction correction value of the position measurement sensor from the reference tool position acquired in the reference tool position acquisition unit, the position of the reference block acquired in the reference block position measurement unit, the relative position calculated in the relative position calculation unit, and the length of the reference tool and store the length direction correction value; and a position measurement unit configured to measure the object by the position measurement sensor mounted to the main spindle and correct a measurement position of the object using the length direction correction value of the position measurement sensor calculated in the length correction value calculation unit.

6. The position measurement system of the object in the machine tool according to claim 5, wherein the machining block is installed to the tool sensor fixed on the table.

7. The position measurement system of the object in the machine tool according to claim 5, wherein the position measurement sensor is configured to measure a position of the translational axes when the position measurement sensor senses the object or a position considering a signal delay.

8. The position measurement system of the object in the machine tool according to claim 5, further comprising a diameter correction value acquisition unit configured to use the reference block as a reference sphere having a spherical diameter and the position measurement sensor as a contact sensor to the object, the diameter correction value acquisition unit being configured to acquire and store a radial direction correction value of the position measurement sensor, wherein the position measurement unit is configured to correct the measurement position using the length correction value acquired in the length correction value calculation unit and the diameter correction value acquired in the diameter correction value acquisition unit.

9. A position measurement program stored in a non-transitory computer-readable recording medium executed by a control device of a machine tool, the position measurement program for causing the control device to perform the position measurement method of the object in the machine tool according to claim 1, wherein the machine tool includes translational axes of three or more axes, a main spindle rotatable with a tool mounted thereon, and a table.

\* \* \* \* \*